Figure 1:
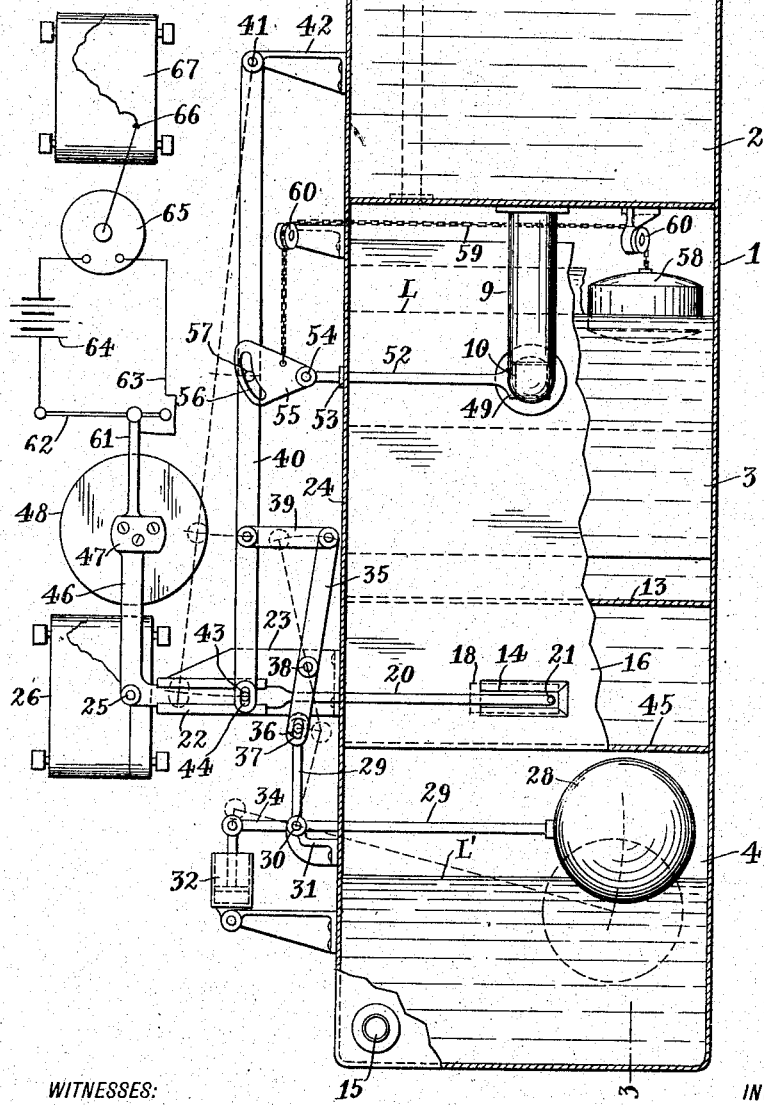

P. R. OWENS.
MEASURING AND REGULATING THE FLOW OF LIQUIDS.
APPLICATION FILED MAR. 12, 1915.

1,191,724.

Patented July 18, 1916.
3 SHEETS—SHEET 1.

WITNESSES:
David J. Walsh
Dyer Smith

INVENTOR
Percy. R. Owens
ATTORNEY

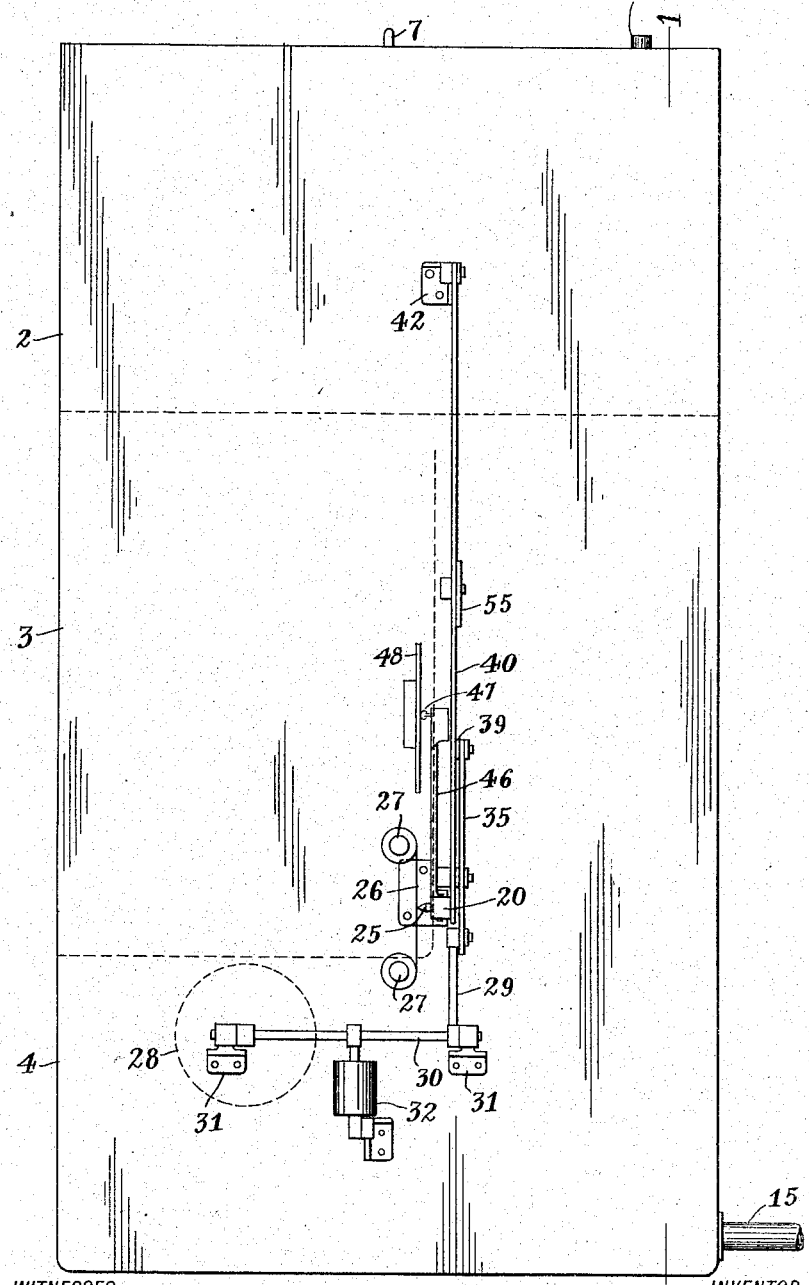

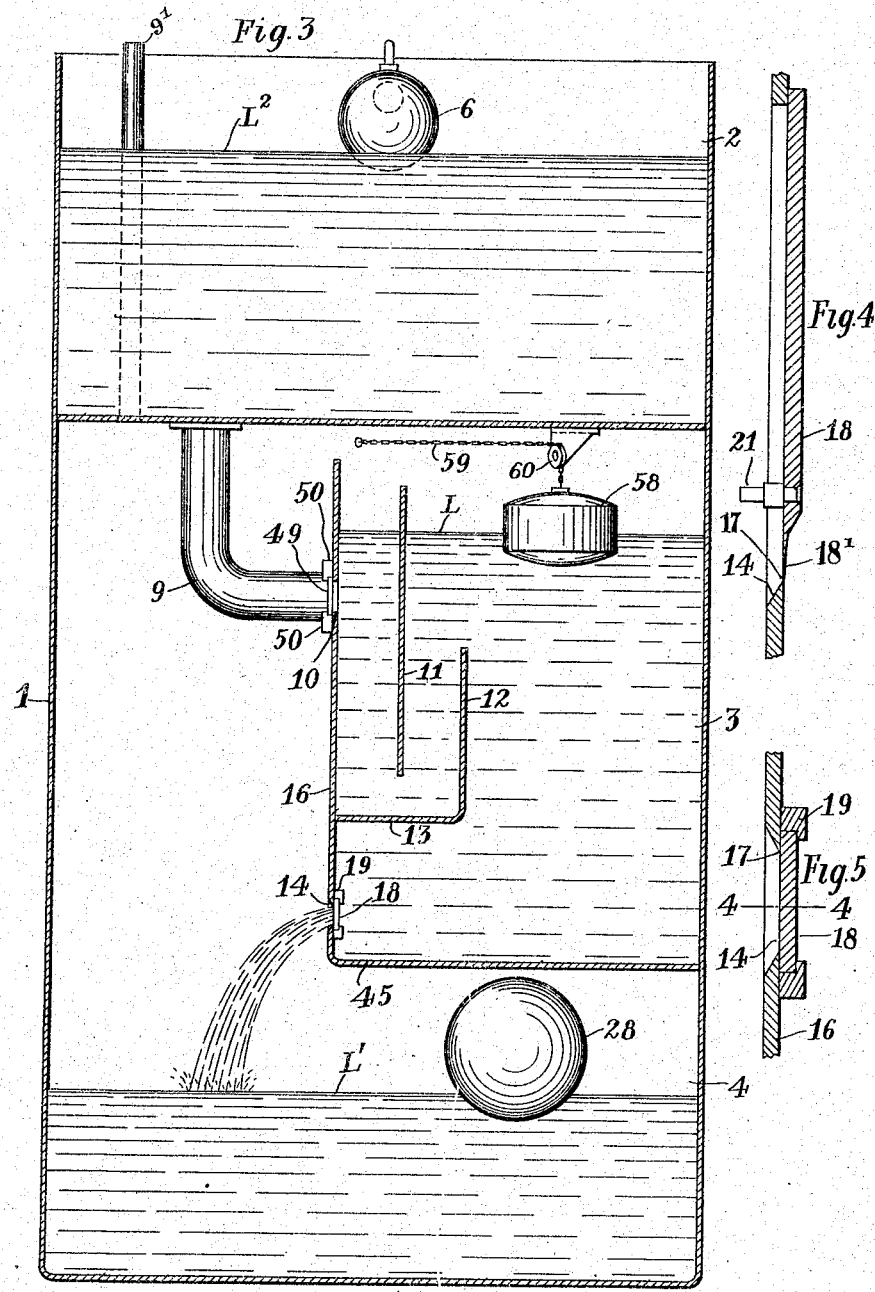

UNITED STATES PATENT OFFICE.

PERCY R. OWENS, OF NEW YORK, N. Y.

MEASURING AND REGULATING THE FLOW OF LIQUIDS.

1,191,724.   Specification of Letters Patent.   Patented July 18, 1916.

Application filed March 12, 1915. Serial No. 14,009.

*To all whom it may concern:*

Be it known that I, PERCY R. OWENS, a subject of the King of Great Britain, residing in the city, county, and State of New York, have invented certain new and useful Improvements in Measuring and Regulating the Flow of Liquids, of which the following is a specification.

My invention relates to a process for measuring and recording the flow of a liquid such as water, from a receptacle, and suitable apparatus for practising such process.

My invention also relates to a process of maintaining an approximately constant liquid level in a receptacle into which liquid is admitted and from which liquid is withdrawn at a variable rate, and means for practising such process. The process and apparatus for keeping constant the level of the liquid in the receptacle, or keeping constant the head of the liquid in the receptacle above the exit orifice therein, constitue in one phase of my invention a portion of my improved process and apparatus for measuring the quantity or rate of flow of liquid from the receptacle. The process and means for maintaining the liquid level constant in the receptacle, however are not limited in their applicability to coaction with the other steps of the process and parts of the mechanism employed in measuring the flow of liquid, but are widely applicable to many other purposes in which it is desirable to maintain the liquid level constant or within defined limits in a receptacle from which the liquid is variably withdrawn.

The chief objects of my invention therefore are to provide means and processes of the character referred to.

Another object of my invention is to provide improved devices for recording at a distant point the quantity or variation of flow of the liquid from the receptacle.

My invention involves the provision of a tank or receptacle from which liquid is withdrawn as demanded from a submerged orifice, the level of the liquid in the receptacle being kept approximately constant, or so maintained that the head of the liquid effective at the orifice shall be approximately constant at all times. The vertical column of liquid in the receptacle above the orifice is sufficiently high so that slight variations in the liquid level will have small effect on the rate of flow of the liquid through the orifice. I vary the area of the exit orifice in proportion to the demand for the liquid to be measured, and record the variation in flow through the orifice as a function of the variation in area of the orifice. Under conditions of constant head of liquid the quantity of liquid flowing through the orifice per unit of time is quite nearly proportional to the area of the orifice through which the liquid flows. In my preferred device, I employ a rectangular orifice near the bottom of the receptacle and govern the effective area of the same by means of a slide valve or shutter, and record the variation of the opening by a stylus connected directly to the valve, this stylus making an appropriate record upon a suitable time-operated sheet.

I maintain the level of the liquid in the receptacle above the exit orifice approximately constant, preferably by varying the area of the inlet opening of the receptacle at the same rate as the exit orifice is varied and simultaneously therewith, the inlet opening as well as the exit orifice being constantly submerged. By this means the liquid level in the receptacle is kept approximately constant. I further largely obviate any errors which may result from this method by means of a float-operated mechanism connected to slightly alter the extent of the inlet opening of the receptacle in accordance with variations in the liquid level within the receptacle.

The feature of my invention which provides for making a record of the liquid flow at a distant point consists in the provision of means for varying the resistance in an electrical circuit in proportion to the variation of flow through the orifice, and controlling the operation of a recording device at a distant point in accordance with such variation of resistance in the circuit.

In order that a clearer understanding of my invention may be had, attention is hereby directed to the accompanying drawings forming part of this application and illustrating certain embodiments of my improved mechanisms, and thereby illustrating a manner in which my improved processes may be practised.

In the drawings, Figure 1 represents a vertical section on line 1—1 of Fig. 2, with the distant recording device indicated diagrammatically, Fig. 2 represents a side elevation of a receptacle provided with my improved mechanism, Fig. 3 represents a vertical section on line 3—3 of Fig. 1, and Figs. 4 and 5 are enlarged detail sections through the exit orifice of the receptacle, together with the valve controlling the same, Fig. 4 being taken on line 4—4 of Fig. 5 and Fig. 5 being a section parallel to the opening.

The apparatus preferably comprises a single frame 1 in which are mounted the tank 2, into which the water or liquid to be measured initially flows, the tank or compartment 3, into which the liquid flows from compartment 2, and from which the liquid is withdrawn as demanded, and a receiving tank 4, into which the liquid flows from tank 3. These three receptacles may, of course, be separated if desired.

Liquid flows into the initial receiving tank 2 through a supply pipe 5, and the liquid level in tank 2 is preferably maintained at an approximately constant height by a float 6 connected by lever 7 to a suitable valve or cock in the pipe connection 8. Liquid flows from tank 2 into chamber 3 through a pipe 9 of suitable diameter leading from the bottom of tank 2 and terminating at the orifice 10 in the side of chamber 3. Orifice 10 is always below the level L of the liquid in chamber 3. Agitation of the liquid in chamber 3 is obviated so far as possible by the partitions 11 and 12 in chamber 3, the entering liquid passing below partition 11 and rising between the same and partition 12. The latter has a horizontal extension 13 extending above the exit orifice 14, through which liquid flows as demanded into the receiving tank 4. Liquid is withdrawn from chamber 4 through pipe 15, in accordance with the demand therefor for boiler feed or other industrial purpose. A pipe 9' is used to connect chambers 3 and 4 with the atmosphere.

The exit orifice 14 is preferably rectangular, situated in the vertical side wall 16 of chamber 3, and near the bottom thereof. The orifice is preferably formed with a knife edge 17, the orifice preferably having its major axis horizontal, the vertical height of the orifice being considerably less than the horizontal length of the same.

The slide valve 18 is arranged to slide horizontally in guides 19 on the inner surface of side member 16 of chamber 3, to cover a greater or less area of orifice 14. It preferably is given a thin edge 18' as shown, to coact with the rear knife edge of the orifice. Valve 18 is moved by a horizontal link 20 mounted on the outer side of frame member 16 and connected to slide valve 18 by a pin 21 extending through the orifice 14. The outer end of link 20 is slidably mounted in a guide 22 supported on a bracket 23 secured to the side member 24 of the receptacle. The stylus 25 is mounted directly on link 20, and records, as link 20 moves horizontally in and out, upon a sheet 26 which is moved vertically, referring to Fig. 1, by suitable clockwork, sheet 26 being indicated diagrammatically as supported upon rollers 27, 27.

The movements of slide valve 18 are preferably controlled by a float 28 in the receiving or outboard tank 4, float 28 being carried by a bell-crank lever 29 pivoted at 30 to a bracket 31 mounted on the side-frame of the tank. A double-actuating dash-pot 32 is preferably employed, the piston thereof being connected by an arm 34 to move with the bell-crank 29. The upper end of vertical arm of bell-crank 29 is suitably connected to actuate a lever 35 as by means of a pin 36 on the bell-crank 29 engaging within a slot 37 in the lower end of the lever. Lever 35 is pivoted at 38 to bracket 23 and is pivotally connected at its upper end by a link 39, to a long vertical lever 40, which is pivoted at its upper end at 41 to a bracket 42, secured to the frame of the upper tank. Lever 40 is connected at its lower end, by a pin and slot attachment 43, 44 to the valve rod 20. It is evident that as the level L' of the liquid in receiving tank 4 falls, when liquid is withdrawn therefrom through pipe 15 at a greater rate, the lower end of lever 40 moves to the left as shown in Fig. 1, and orifice 14 is opened to a greater extent, the positions taken by the lever and link mechanisms being shown in dotted lines in Fig. 1. Also as the demand for liquid decreases and float 28 rises, valve 14 is moved to the right to restrict the area of the orifice 14. The parts are so proportioned that the flow through orifice 14 is at all times approximately equal to the demand for liquid from tank 4. It is evident that this may be accomplished since I maintain an approximately constant head of water above the orifice 14 in chamber 3, and the rate of flow through orifice 14 is a function of the effective area thereof under conditions of constant head, the quantity of liquid flowing per unit of time through the orifice being equal to a constant multiplied by the square root of the head and by the area of the opening. I so proportion the parts that a given drop of the liquid level in chamber 4 results in a sufficient increase of opening of orifice 14, to cause the flow through the orifice to approximately equal that through pipe 15. Since valve 18 moves horizontally, the horizontal axis of the effective portion of the orifice is not changed by movements of the valve, and, the level L of the liquid in chamber 3 remaining the same, the head effective at the orifice is not altered by the movements of the valve. A similar result can be achieved if the orifice is situated in the bottom horizontal member 45 of chamber 3, with the valve moving over the same in the manner described.

The flow through a rectangular orifice such as that illustrated at 14, is quite closely proportional to the area of the orifice and for commercial purposes it is usually sufficient to make the orifice exactly rectangular. For various reasons, however, the rate of flow differs slightly from this ratio for different increments of opening of the valve and if desired correction may be made for this divergence by slightly varying the sides of the orifice from the rectangular shape. By making the horizontal dimension of the orifice greater than its vertical dimension, as I preferably do, a greater movement of the valve and recording stylus 25 is provided for, than if the vertical dimension of the orifice were proportionally greater. The record sheet 26 may be suitably ruled and marked so that the graph traced by the stylus will indicate the rate of flow through the orifice at each unit of time. The valve rod 20 carrying stylus 25 is preferably provided with an angular extension 46 carrying a planimeter diagrammatically indicated at 47, operating upon a time-actuated table or surface 48 to integrate the total flow through orifice 14 in the well-known manner.

The head within chamber 3 effective at orifice 14 is preferably maintained approximately constant by the following means. Liquid is admitted into chamber 3 through orifice 10 at approximately the same rate that it is withdrawn through orifice 14 and simultaneously therewith. The effective area of orifice 10 is substantially the same at all times as that of orifice 14, and the head of liquid effective at orifice 10 is substantially the same as that at orifice 14. Under these conditions, the rate of flow into chamber 3 will always be substantially the same as the rate of flow therefrom. Orifice 10 is provided with a horizontally slidable valve 49 mounted in guides 50 on the outer side of frame member 16 of chamber 3. A horizontal movable valve rod 52 is secured to the valve and extends through a guide 53 to a pivotal connection 54 with a member 55 having a cam slot 56 therein with which engages a pin 57 on lever 40. Preferably pin 57 is located at one-half the distance between pivot 41 and pin 43 at the ends of lever 40 and the vertical height of opening 10 is twice that of orifice 14. Under these conditions when pin 57 is in its central position in slot 56, the movement of rod 52 at any moment is one-half of that of valve rod 20, so that the area of effective opening through port 10 is equal to that through orifice 14. The total area of orifice 10 is preferably equal to that of orifice 14. If the head effective at orifice 10, (distance $L-L^2$), is equal to that at orifice 14, (distance from L to center of orifice 14), the rate of flow through orifice 10 will equal the rate of flow through orifice 14 when the areas of the same are equal. The valve 8 and float 6 in the upper tank 2, however, are not sufficient to keep the liquid level $L^2$ in the upper tank 2 exactly constant, and since my object is to keep the level L in chamber 3 as nearly constant as may be, corrections must be made to open orifice 10 wider when the level L in chamber 3 falls and to somewhat restrict the opening of orifice 10 when the level rises, a somewhat larger opening of orifice 10 being required when the head effective at orifice 10 is less than that of orifice 14, to enable the rate of admission into chamber 3 to equal the rate at which water is withdrawn therefrom. To automatically perform this correction, the float 58 is suspended within chamber 3 by a chain 59 passing over pulleys 60 and connected to member 55 as shown. The result of this construction is that when liquid level L falls, float 58 falls therewith and connection 59 slightly raises member 55, rod 52 moving outwardly a slight amount as pin 57 moves in slot 56 to open orifice 10 a slightly greater amount than that corresponding to the intermediate position of pin 57. Similarly when float 58 rises, pin 57 rises in slot 56 and the valve is moved to the right, referring to Fig. 1, to restrict the opening of orifice 10.

I consider the provisions herein described, for maintaining the level L of the liquid in chamber 3 approximately constant, to be an important part of my invention. It should be understood that such devices are not limited in their applicability to a process of or apparatus for measuring the flow of liquids such as described herein, but that this part of my invention may be utilized for maintaining the level of liquid in any tank as desired, when liquid is withdrawn from the tank at a variable rate for any purpose.

It is often desirable to record the rate of flow through orifice 14 at a distant point, such as the office of the manager. To make such a record, an arm 61 may be connected to or secured to the recorder arm 46 and caused to move over a resistance element diagrammatically indicated at 62, to render the same more or less effective in proportion to the movements of valve 18. Resistance 62 is included in a circuit 63 including an electric source 64 and a suitable electrical indicating device 65 carrying a stylus 66 movable over a suitable time-actuated sheet 67 situated at the point at which the record is to be kept. More or less resistance is cut into the circuit in proportion to the variation of opening of orifice 14 and the rate of flow of liquid therethrough, and the electrical device 65 is adjusted to operate in accordance with the resulting variation of potential to record variation of flow through orifice 14.

The operation of my improved devices is sufficiently indicated above. It is to be understood that my invention is not limited strictly to the exact details of construction shown, but is as broad as is indicated by the appended claims. My improved process of measuring a liquid may be considered broadly as consisting in maintaining the liquid to be measured at such a level in a receptacle as to provide an approximately constant head at the submerged orifice through which the liquid to be measured flows, varying the area of this orifice proportionately to the variation in demand for the liquid to be measured, and moving an indicating device proportionately to the variations in the area of the orifice. In practising such a method, the head above the orifice should be of a substantial amount so that slight variations therein have little influence on the rate of flow through the orifice, and the method of varying the area of the orifice should be of such a character as not to alter the head effective at the orifice. This method enables me to measure the flow of liquids in an extremely exact manner and by comparatively simple means. By this method the necessity for making calculations or corrections in accordance with the variation in head at the orifice common to many types of measuring instrument is done away with. Also the difficulties incident to the shape of a diverging orifice are removed by the use of the simple rectangular shape disclosed herein. My invention, however, is not limited entirely to the use of a rectangular orifice or to the use of a valve of the character disclosed, since it is obvious that other types of submerged orifice and valve may be used if the proportions and movements of the parts are so calculated as to cause the valve by its movement to increase or decrease the area of the opening in a manner which can be recorded and in proportion to the demand for liquid to be measured.

The provision of the upper tank 2 and of the devices described for maintaining the level L in chamber 3, is not always necessary in practice, for measuring the flow through orifice 14, provided that a sufficiently high column of water is maintained above orifice 14, and the level of the same is maintained approximately constant. That is to say, in many instances, the upper tank 2 may be done away with and the liquid introduced directly into chamber 3 through a pipe such as is indicated at 5, the level L being approximately maintained by a float such as 6 and a valve such as 8. In this instance, the entrance orifice 10 for chamber 3 would not be used and valve 49 and its connection, and float 58 and its connection, would not be used. In this case, the head effective at orifice 14 would not vary greatly if the column of water above orifice 14 were of considerable height, so that variations in the level L would be very small proportionally to the total height of the column of water above orifice 14.

It is to be noted that variation in the temperature of the liquid in chamber 3 slightly varies the volume thereof and accordingly the head of a column of water of given height. Correction may automatically be made for any such slight errors, due to temperature, in my apparatus by so weighting the float 58 that the same sinks to a desired level, under usual temperature conditions encountered, to maintain the level L in chamber 3 at the desired height. When the liquid in chamber 3 becomes hotter and therefore less dense, float 58 sinks somewhat deeper into the same automatically opening the valve 49 somewhat more to raise level L slightly to overcome the loss of pressure because of the rise in temperature.

It is obvious that my described method and apparatus for measuring liquid flowing out of a tank may be used equally well for measuring liquid flowing into the same. For example, it is often desirable to measure the condensate from a condenser, of a steam turbine, for example, during a period of time. In such a case it is the liquid flowing into tank 3, through orifice 10, instead of the liquid flowing out of the tank through orifice 14, which is to be measured. Under these conditions the apparatus shown is reversed, the float 28 being in the inlet tank 2 instead of the outlet tank 4, the recording apparatus is operated by the valve of inlet orifice 10 instead of the valve of orifice 14, and the movements of the inlet valve are governed by float 28. This only necessitates the reversal of the lever connections, link 40 being pivoted at the opposite end, and float 58 with its differential devices 55, etc., governing the amount of opening of orifice 14 instead of orifice 10.

Having now particularly described my invention, what I claim and desire to protect by Letters Patent is as follows:

1. In a liquid measuring apparatus, the combination of a receptacle having entrance and exit orifices therein, horizontally movable slide valves governing the effective areas of said orifices, means connecting said valves together for simultaneous movement, means for moving the valves together so that the effective openings of the orifices shall be substantially the same at all times, and means for maintaining substantially the same head at each orifice at all times, substantially as set forth.

2. In a liquid measuring apparatus, the combination of a receptacle, an inlet tank, an outlet tank, means including a submerged orifice in said receptacle, for causing liquid to flow from said inlet tank to said receptacle and thence to said outlet tank, means for maintaining a constant head of liquid in said receptacle above said orifice, a slide valve mounted to move horizontally over said orifice, to govern the extent of opening of said orifice, a rod on the outer side of said receptacle movable with said valve, a float in one of said tanks, and pivoted links connecting said rod and float, substantially as set forth.

3. In a liquid measuring apparatus, the combination of a receptacle, having a submerged rectangular exit orifice therein, having a knife edge, a receiving vessel, into which liquid flows from said orifice, means for maintaining a constant head of liquid above said orifice in said receptacle, a slide valve mounted in guides on the inner side of said orifice to move horizontally, for governing the extent of opening thereof, and having a thin edge adapted to coact with said knife edge, a rod on the outer side of said receptacle, connected to and movable with said slide valve, and means for moving said rod and thereby said valve in such manner that the area of opening of said valve varies in direct proportion to the rate at which liquid is drawn from said receiving vessel, substantially as set forth.

4. In a liquid measuring apparatus, the combination of a receptacle having a rectangular exit orifice therein, having its major axis horizontal, means for maintaining a constant head of liquid in said receptacle above said orifice, a receiving vessel, into which liquid flows from said orifice, and from which liquid is variably drawn as demanded, a slide valve mounted to move horizontally over said orifice, to govern the extent of opening of said orifice, a rod on the outer side of said receptacle movable with said valve, a float in said vessel, pivoted links connecting said rod and float, and a dash-pot connected with said links and float, substantially as set forth.

5. In a liquid measuring apparatus, the combination of a receptacle having submerged entrance and exit orifices therein, horizontally movable slide valves governing the effective areas of said orifices, a vessel receiving liquid from said exit orifice, and from which liquid is variably withdrawn as demanded, means connecting said valves together for movement, and means for moving the valves together in accordance with the demand for liquid from said vessel, in such manner that the product of the effective area of opening multiplied by head, at each orifice, shall be substantially the same at each orifice at all times, substantially as set forth.

6. In apparatus of the character described, the combination of a receptacle having a submerged exit orifice and a submerged entrance orifice therein, valves governing the effective areas of said orifices, a link and connections for moving the valves together so that the effective openings of the orifices shall be substantially the same at all times, a vessel receiving liquid from said exit orifice and from which liquid is variably withdrawn as demanded, and means for maintaining substantially the same head at each orifice at all times, substantially as set forth.

7. In apparatus of the character described, the combination of a receptacle having a submerged exit orifice and a submerged entrance orifice therein, valves governing the effective areas of said orifices, means for moving the valves together so as to uncover substantially equal areas of said orifices simultaneously, means for maintaining a head at the entrance orifice approximately equal to that at the exit orifice, and means for varying the proportionate extent of opening of one of said orifices in accordance with variations in the liquid level in said receptacle, to keep said level approximately constant, substantially as set forth.

8. In apparatus of the character described, the combination of a receptacle having a submerged exit orifice and a submerged entrance orifice therein, valves governing the effective areas of said orifices, means for moving one of said valves variably, connections for moving said other valve simultaneously therewith in such manner as to cause liquid to flow therethrough at approximately the same rate liquid is flowing through said first named valve, a float in said receptacle, and means operated thereby for adjusting the movement of said other valve, to maintain the liquid level in said receptacle substantially constant, substantially as set forth.

9. In apparatus of the character described, the combination of a receptacle having a submerged exit orifice and a submerged entrance orifice therein, valves governing the effective areas of said orifices, means for moving said exit valve variably, connections for moving said entrance valve simultaneously therewith in such manner as to uncover substantially equal areas of said orifices simultaneously, and means for varying the said proportion between the openings of said valves to open said entrance orifice somewhat wider than the proportionate amount as the liquid level in said receptacle falls, and somewhat restricting said orifice relatively to the said proportionate amount, as the liquid level rises, substantially as set forth.

10. In apparatus of the character described, the combination of a receptacle having a submerged exit orifice and a submerged entrance orifice therein, valves governing the effective areas of said orifices, valve rods for said valves, a member connected to both rods and movable to so actuate each as to uncover substantially equal areas of said orifices simultaneously, and means for varying the proportion between the said openings, to compensate for difference in head at said orifices, to maintain the liquid level in said receptacle substantially constant, substantially as set forth.

11. In apparatus of the character described, the combination of a receptacle having a submerged exit orifice and a submerged entrance orifice therein, valves governing the effective areas of said orifices, valve rods for said valves, a member connected to both rods and movable to so actuate each as to uncover substantially equal areas of said orifices simultaneously, a differentially-movable member in the connection between said member and one of said rods, a float in said receptacle, and connections therefrom to said differentially-movable member, to so move the same as to vary the throw of the valve connected therewith, to maintain the liquid level in said receptacle substantially constant, substantially as set forth.

12. The process of maintaining a constant liquid level in a receptacle having entrance and exit orifices, to or from one of which liquid is supplied or withdrawn at a variable rate, consisting in maintaining an approximately equal head at both orifices, varying the effective area of opening of one orifice simultaneously with that of the other, so as to keep substantial equality between the said areas of opening, and varying the proportion between the amounts of opening, as the liquid level rises or falls, sufficiently to maintain the level substantially constant, substantially as set forth.

This specification signed and witnessed this 9th day of March, 1915.

PERCY R. OWENS.

Witnesses:
DYER SMITH,
FRANK H. DRAHAS.

Copies of this patent may be obtained for five cents each, by addressing the "Commissioner of Patents, Washington, D. C."